No. 861,670.

PATENTED JULY 30, 1907.

J. C. McVEY.
DISH WASHING MACHINE.
APPLICATION FILED MAR. 24, 1906.

2 SHEETS—SHEET 1.

Witnesses:
R. C. Hamilton
E. B. House

Inventor,
John C. McVey
By Warren D. House
His Attorney

No. 861,670.  
PATENTED JULY 30, 1907.

J. C. McVEY.  
DISH WASHING MACHINE.  
APPLICATION FILED MAR. 24, 1906.

2 SHEETS—SHEET 2.

Witnesses:  
R. E. Hamilton  
E. B. House

Inventor,  
John C. McVey  
By his Attorney Warren D. House

UNITED STATES PATENT OFFICE.

JOHN C. McVEY, OF KANSAS CITY, MISSOURI.

DISH-WASHING MACHINE.

No. 861,670. Specification of Letters Patent. Patented July 30, 1907.

Application filed March 24, 1906. Serial No. 307,849.

*To all whom it may concern:*

Be it known that I, JOHN C. McVEY, a citizen of the United States, residing at Kansas City, in the county of Jackson and State of Missouri, have invented certain new and useful Improvements in Dish-Washing Machines, of which the following is a specification.

My invention relates to improvements in dish washing machines.

The object of my invention is to provide a dish washing machine with which dishes may be quickly and thoroughly washed and rinsed with the expenditure of a minimum amount of labor and with the employment of no greater amount of water than would be required in washing the dishes in the ordinary manner.

The novel features of my invention are hereinafter fully described and claimed.

Figure 1:
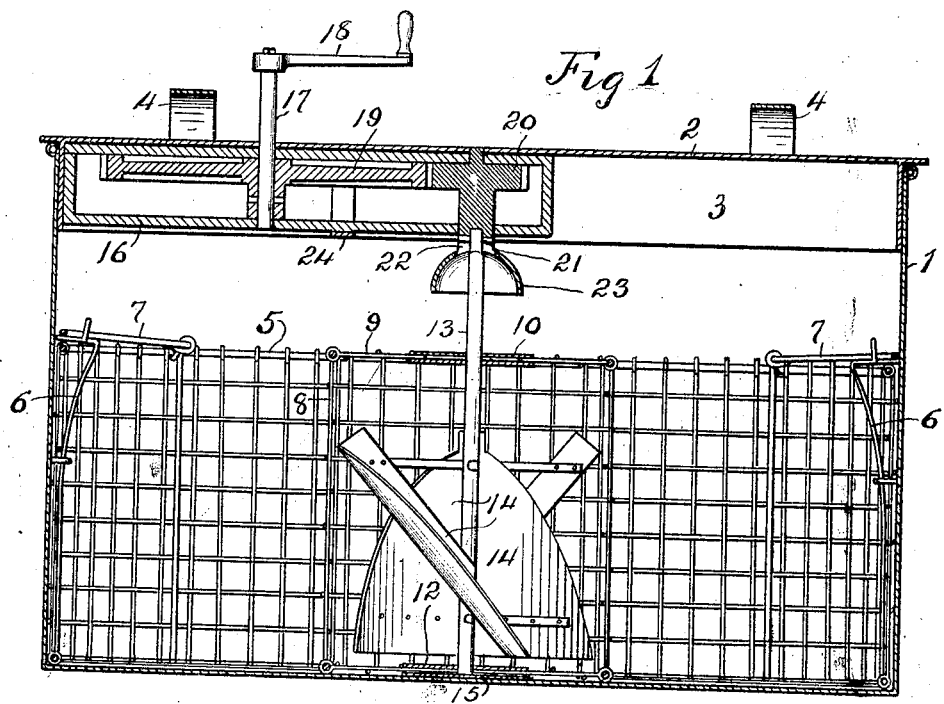
Figure 2:
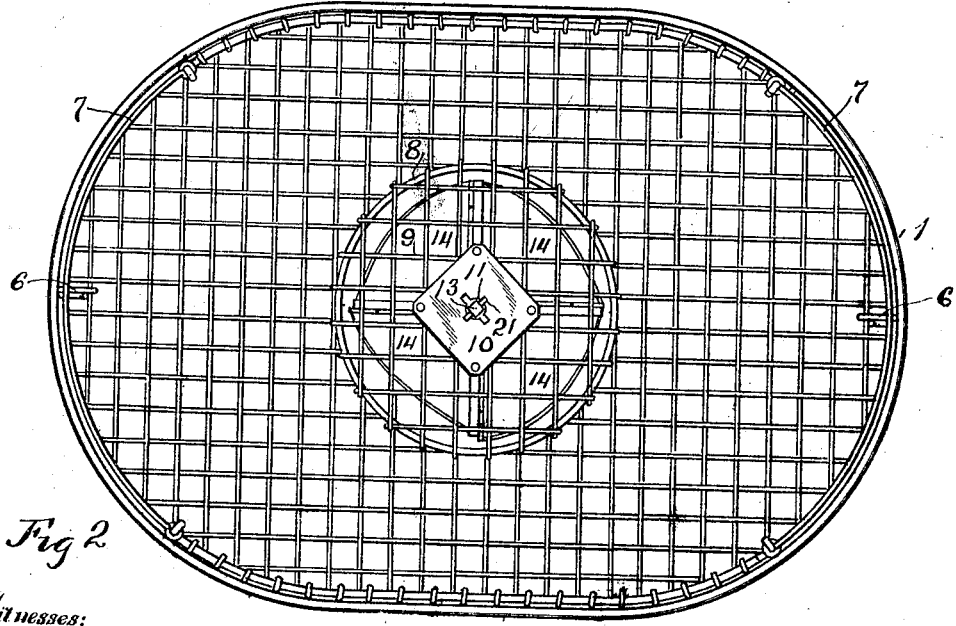
Figure 3:
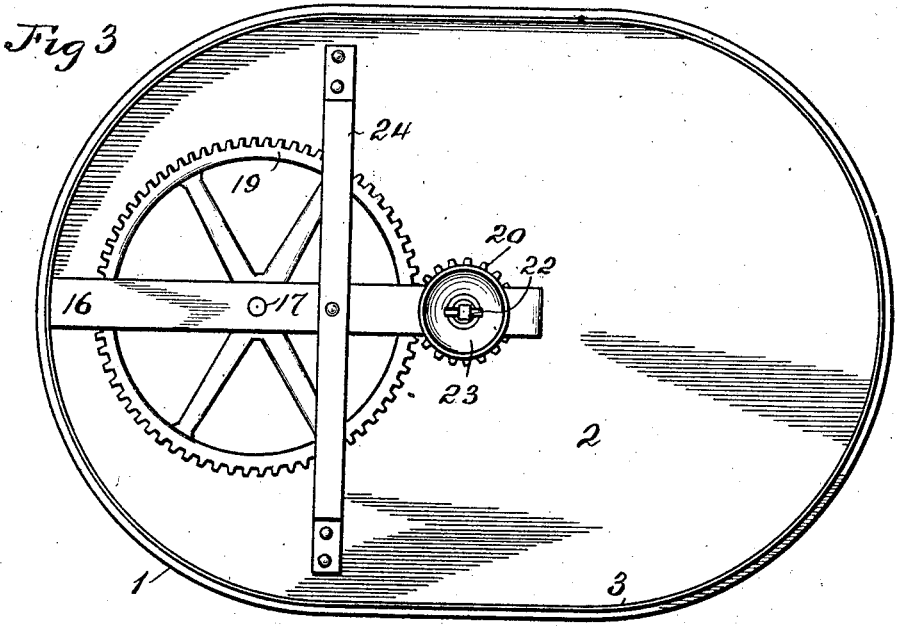
Figure 4:
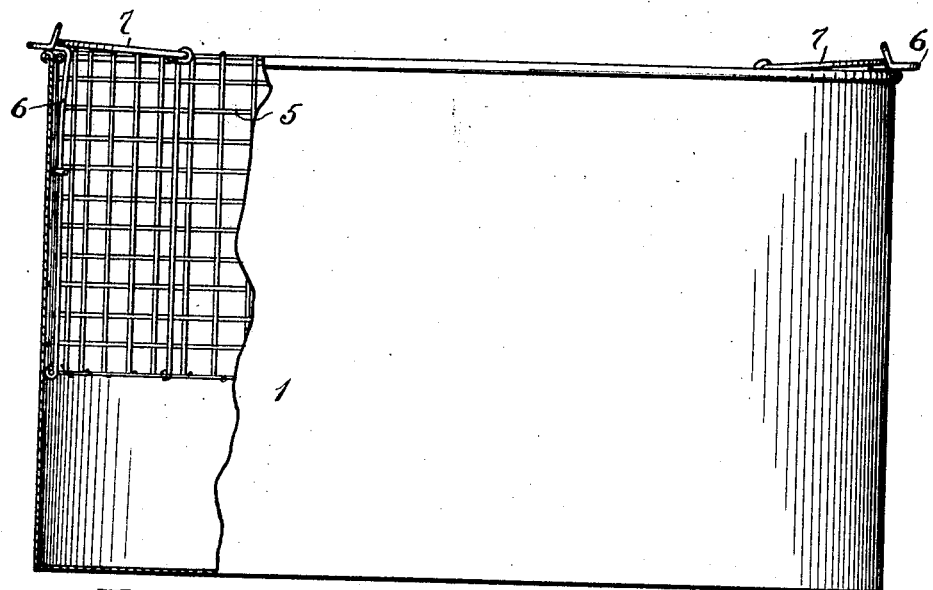

In the accompanying drawings illustrative of my invention—Figure 1 is a central, longitudinal, vertical sectional view of the machine, showing the parts in the positions occupied by them during the washing operation. Fig. 2 is a top view of the machine with the cover and parts connected therewith removed. Fig. 3 is a plan view of the underside of the cover. Fig. 4 is a view of the machine with the cover and parts connected therewith removed, the water receptacle being shown partly in elevation and partly broken away and the basket disposed in the raised position occupied by it when the dishes are being rinsed.

Similar characters of reference denote similar parts.

1 denotes the water receptacle having an open upper end and preferably having an oval form similar to an ordinary wash boiler.

2 denotes the cover for the receptacle, provided preferably with a downwardly extending flange 3, fitted to the inner periphery of the receptacle 1, the cover having on its upper side two handles 4.

Vertically movable in the receptacle 1 is a dish holding device, comprising preferably a basket 5, made of wire, having an open upper end and fitted to the inside of the receptacle 1. That the basket may be suspended, as shown in Fig. 4, for the purpose hereinafter described, any suitable means may be employed, the preferable means being that shown in the drawings, and comprising two oppositely disposed catches 6 for releasably engaging the inner basket member 5 with the water receptacle member 1. The said catches 6 are preferably formed each of a resilient wire the lower end of which is secured to the basket 5 and the upper end of which is turned outwardly at right angles and is adapted to slip over the upper edge of the receptacle 1, as shown in Fig. 4, for the purpose of supporting the basket in the raised position. The tension of the catches 6 is such that when the basket is raised to the position shown in Fig. 4, the catches will automatically move outward and be disposed above the upper edge of the receptacle 1, thus providing automatically actuated means for supporting the basket, when the basket has been raised to the proper position.

For lifting the basket, said basket is provided adjacent opposite ends with two handles, composed preferably of two wires 7, pivotally connected at their ends to the upper end of the basket so as to form swinging bails, which, when not in use, may be horizontally disposed, as shown in the drawing.

Centrally disposed in the basket and secured to the bottom thereof, is a circular cage 8, formed preferably of wire and having a horizontal wire netting forming a top 9, to which is secured, in any suitable manner, a central bearing plate 10, provided with a central vertical opening 11, disposed in vertical alinement with a corresponding opening in a horizontal plate 12, secured within the cage 8 to the upper side of the bottom of the basket 5.

Mounted in the basket is a propeller comprising a vertical shaft 13 rotatively mounted in the openings provided in the plates 10 and 12, and having secured to it, within the cage 8, one or more blades 14, preferably inclined, as shown in Fig. 1. The lower end of the shaft 13 rests upon the upper side of a horizontal plate 15 secured to the underside of the basket 5. When the shaft 13 is rotated in the proper direction, water having previously been placed within the receptacle 1, the water in the receptacle will be thrown upwardly and outwardly. For the purpose of rotating the propeller shaft 13, the following mechanism is preferably employed:—

Secured in any suitable manner at its upper end, to the lower side of the cover 2, is a U-shaped bracket 16. Rotatively mounted in an opening provided in the horizontal portion of said bracket is a vertical shaft 17, which extends through an opening in the cover 2 and has secured to it at its upper end a crank 18, by means of which the shaft 17 may be rotated. Secured rigidly upon the shaft 17, between the bracket 16 and the cover 2, is a spur gear wheel 19, which meshes with a pinion 20, the vertical shaft portion of which is rotatively mounted in vertical holes provided therefor in the bracket 16 and the cover 2. The upper end of the shaft 13 is of a shape other than round, preferably square in cross section and provided with a transverse opening in the squared portion, in which is rigidly secured a horizontal pin 21. The lower end of the shaft portion of the pinion 20 is provided with a socket 22, in which the upper end of the shaft 13 is fitted and from which said shaft is detachable when the cover 2 is vertically removed from the receptacle 1. At the lower end of the shaft portion of the pinion 20 below the bracket 16 and preferably an integral portion of the pinion shaft, is an inverted funnel-shaped or flaring guide 23, by means of which, when the cover 2 is placed upon the receptacle 1, the upper end of the shaft 13 may be readily guided into engagement with the socket portion of the pinion 20. To prevent any lateral movement of the bracket 16 it has secured to it, at right angles thereto, a U-shaped bracket 24, the upper ends of which are rigidly secured to the under side of the cover 2.

In operating my invention, the cover 2 is first removed and the basket 5 disposed in the lower position, as shown in Fig. 1. The dishes to be washed are then placed in the basket 5 around the cage 8, after which boiling water, preferably containing soap, is then poured over the dishes. The cover 2 is then placed upon the receptacle 1, thus engaging the upper end of the propeller or dasher shaft 13 with the pinion 20. The crank 18 is then rotated in a direction such that the blades 14 will be revolved in a direction that the water will be thrown by said blades upwardly and outwardly. By rapidly turning the crank 18 for a minute or two the scalding water will be thrown violently against the dishes and they will be quickly cleaned thereby. The cover 2 is then removed, after which, by grasping the handles 7, the basket 5 containing the dishes may be lifted to the position shown in Fig. 4 at which time the catches 6 will engage the upper edge of the receptacle 1 and support the dishes above the water which was used to wash the dishes. Clean, scalding water is then poured over the dishes for the purpose of rinsing them, after which they may be removed from the basket for drying. By employing inclined blades 14, a relatively small amount of water may be employed for the washing purpose, as the blades will scoop up the water and cause it to fall upon and be dashed against all portions of the dishes contained in the basket.

It will be obvious that very many structural modifications may be made and which will nevertheless be included within the scope of my invention.

Having thus described my invention, what I claim and desire to secure by Letters Patent, is:—

1. In a dish washing machine, the combination with a water receptacle having an open upper end, of a cover therefor, a dish holding basket in said receptacle, a cage mounted in said basket, a propeller comprising a shaft rotatively mounted in the upper and lower ends of said cage and having one or more blades attached to it and revoluble in the cage, and means carried by the cover for engaging and rotating said shaft when the cover is properly positioned on the receptacle and detachable from the shaft when the cover is removed.

2. In a dish washing machine, the combination with a water receptacle having an open upper end, of a cover therefor, a dish holding basket mounted in said receptacle, a propeller mounted in said basket and comprising a vertical rotary shaft having attached to it one or more blades, a rotary driving device carried by the cover and provided with means for releasably engaging said shaft when the cover is properly positioned on the receptacle and detachable from the shaft when the cover is removed, means for guiding said shaft into engagement with said rotary device, and means for rotating said rotary device.

3. In a dish washing machine, the combination with a water receptacle having an open upper end, of a cover therefor, a dish holding basket vertically movable in said receptacle, a propeller rotatively mounted in said basket and comprising a vertical rotary shaft having attached to it one or more blades, means by which the basket may be supported in a raised position in the receptacle, a rotary device mounted on said cover, and provided with means for releasably locking with said shaft when the cover is properly positioned on the receptacle and detachable from the shaft when the cover is removed, said rotary device having a flaring lower end for guiding said shaft into proper engagement with said rotary device, and means for rotating said rotary device.

In testimony whereof I affix my signature in presence of two witnesses.

JOHN C. McVEY.

Witnesses:
 E. B. HOUSE,
 HENRY F. ROSE.